United States Patent
Kawase

(10) Patent No.: US 7,643,388 B2
(45) Date of Patent: Jan. 5, 2010

(54) OPTICAL DISC APPARATUS AND OPTICAL-PICKUP MOVEMENT CONTROL METHOD INSTALLED IN OPTICAL DISC APPARATUS

(75) Inventor: Shigeru Kawase, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 549 days.

(21) Appl. No.: 11/603,497

(22) Filed: Nov. 21, 2006

(65) Prior Publication Data

US 2007/0115769 A1    May 24, 2007

(30) Foreign Application Priority Data

Nov. 24, 2005   (JP)   ............................. 2005-338291
Oct. 10, 2006   (JP)   ............................. 2006-276400

(51) Int. Cl.
G11B 7/00   (2006.01)
G11B 20/18  (2006.01)

(52) U.S. Cl. .................................. 369/44.28; 369/53.15
(58) Field of Classification Search .............. 369/44.28, 369/53.15
See application file for complete search history.

(56) References Cited

U.S. PATENT DOCUMENTS 6,026,066 A * 2/2000 Maezawa .................. 369/44.28

FOREIGN PATENT DOCUMENTS

| JP | 05-114145 | 5/1993 | ...................... 7/85 |
| JP | 05-166201 | 7/1993 | ...................... 7/85 |
| JP | 10-320897 | 12/1998 | ...................... 19/2 |
| JP | 2000-285479 | 10/2000 | ...................... 7/85 |

* cited by examiner

Primary Examiner—Joseph H Feild
Assistant Examiner—Nicholas Lee
(74) Attorney, Agent, or Firm—Renner, Kenner, Greive, Bobak, Taylor & Weber

(57) ABSTRACT

A light beam is emitted to an optical disc from an optical pickup. The optical pickup is moved over the optical disc so that a light spot of the light beam crosses tracks formed on the optical disc. Detected are tracking error signals carried by a light beam reflected from the optical disc. Each tracking error signal is detected when the light spot crosses a corresponding track among the tracks formed on the optical disc. Track crossing pulses are generated based on the tracking error signals. Each track crossing pulse is generated for the corresponding track. Measured next is a half period of each track crossing pulse. It is determined whether a defect occurs to each track crossing pulse, based on a latest half period measured at present and an anterior half period measured one half-period before the latest half period. Generated when determined that no defect occurs is an average half period of the latest and the anterior half periods. Generated when determined that the defect occurs is a corrected average half period based on the latest half period and a plurality of anterior half periods measured before the latest half period. A reference half period is generated that indicates a predetermined speed for the optical pickup to move over the optical disc. The optical pickup is then moved at the predetermined speed based on the reference half period and the average half period or the corrected average half period.

6 Claims, 7 Drawing Sheets

OPTICAL DISC APPARATUS AND OPTICAL-PICKUP MOVEMENT CONTROL METHOD INSTALLED IN OPTICAL DISC APPARATUS

CROSS-REFERENCE TO RELATED APPLICATIONS

This application is based on and claims the benefit of priority from the prior Japanese Patent Application Nos. 2005-338291 filed on Nov. 24, 2005 and 2006-276400 filed on Oct. 10, 2006, the entire contents of which are incorporated herein by reference.

BACKGROUND OF THE INVENTION

The present invention relates to an optical disc apparatus for use in recording and/or reproducing data on and/or from an optical disc. Particularly, this invention relates to an optical disc apparatus in which an optical pickup is stably moved to a target track and an optical-pickup movement control method to be installed in such an optical disc apparatus.

In optical disc apparatuses, data recording or reproduction is performed in such a manner that a light beam (a laser beam) for recording or reproduction is emitted from an optical pickup to an optical disc having a spiral or concentric tracks formed thereon, with a light spot moving along the tracks. The light spot is formed by converging the light beam through an objective lens attached to the optical pickup and required to be in focus while moving along the tracks. For this purpose, the objective lens is always under focus and tracking control.

One requirement for optical disc apparatuses is that an optical pickup be moved to a predetermined track or a target track designated by user operation in start-up, just before recording or during reproduction. This operation requires: focus control under which the optical pickup is moved in the radius direction of an optical disc in a short time and stopped over a target track; and tracking control to the target track.

Such an operation in which an optical pickup is moved to a target track at a high speed and stopped over the target track is called multitrack jump.

Described below is an optical-pickup movement control technique for multitrack jump.

A sign-wave tracking error signal is generated whenever a light beam crosses a track while an optical pickup is moving toward a target track. A pulse is then generated at a rising moment at a zero crossing point (level zero) of each tracking error signal. This pulse is called a track crossing pulse. The number of track crossing pulses corresponds to the number of tracks the light beam has crossed. The number of track crossing pulses also indicates how much the optical pickup is moved in the radius direction of an optical disc. The reciprocal of a period of a track crossing pulse (or an interval between two consecutive track crossing pulses) indicates a moving speed of the optical pickup. The moving speed is controlled based on the reciprocal mentioned above in such a way that the speed is lowered as the optical pickup is moving closer to a target track and the then optical pickup is stopped over the target track.

Discussed below are disadvantages of the optical-pickup movement control technique described above.

Tracking error signals are generated based on reproduced signals gained from light beams reflected from an optical disc. The tracking error signals having sign waves could suffer decrease in signal level, phase shift or signal drop-outs, etc., when the optical disc has a damaged or dirty section on its surface. This abnormal condition in which signals are not reproduced normally is called a defect of reproduced signals. Such a defect of reproduced signals causes erroneous detection of a moving distance of an optical pickup (the number of tracks the pickup has crossed). This results in that the optical pickup cannot be stopped over a target track.

Japanese Unexamined Patent Publication Nos. 05(1993)-114145 and 05(1993)-166201 disclose techniques to solve such problems with compensation of dropped-out track crossing pulses with interpolated dummy pulses.

These techniques with interpolation of dummy pulses, however, still have a difficulty in compensation for variation in moving speed of an optical pickup for the period in which no track crossing pulses are gained, thus having a difficulty in adjustments to moving speed. In detail, the moving speed cannot be quickly adjusted when a defect of reproduced signals occurs. Particularly, when such a defect occurs just before a target track, the optical pickup cannot be stopped over this track. In other words, a so-called "off track" occurs.

SUMMARY OF THE INVENTION

A purpose of the present invention is to provide an optical disc apparatus and an optical-pickup movement control method to be installed in an optical disc apparatus in which a moving speed of an optical pickup is accurately controlled even if reproduced signals suffer drop-outs, level decrease, etc., during multitrack jump, due to damage or dirt on an optical disc.

The present invention provides an optical disc apparatus comprising: an optical pickup to emit a light beam to an optical disc; a moving mechanism to move the optical pickup over the optical disc so that a light spot of the light beam crosses tracks formed on the optical disc; a tracking error detector to detect tracking error signals carried by a light beam reflected from the optical disc, each tracking error signal being detected when the light spot crosses a corresponding track among the tracks formed on the optical disc; a track-crossing pulse generator to generate track crossing pulses based on the tracking error signals, each track crossing pulse being generated for the corresponding track; a period measurer to measure a half period of each track crossing pulse; a defect detector to determine whether a defect occurs to each track crossing pulse, based on a latest half period measured at present and an anterior half period measured one half-period before the latest half period; an average-period generator to generate an average half period of the latest and the anterior half periods when determined that no defect occurs whereas to generate a corrected average half period based on the latest half period and a plurality of anterior half periods measured before the latest half period when determined that the defect occurs; a reference period generator to generate a reference half period that indicates a predetermined speed for the optical pickup to move over the optical disc; and a servo mechanism to control the moving mechanism to move the optical pickup at the predetermined speed based on the reference half period and the average half period or the corrected average half period.

Moreover, the present invention provides an optical-pickup movement control method comprising the steps of: an emitting step of emitting a light beam from an optical pickup to an optical disc; a first moving step of moving the optical pickup over the optical disc so that a light spot of the light beam crosses tracks formed on the optical disc; a tracking-error detecting step of detecting tracking error signals carried by a light beam reflected from the optical disc, each tracking error signal being detected when the light spot crosses a corresponding track among the tracks formed on the optical disc; a track-crossing pulse generation step of generating track crossing pulses based on the tracking error signals, each track crossing pulse being generated for the corresponding track; a period measuring step of measuring a half period of each track crossing pulse; a defect detecting step of determining whether a defect occurs to each track crossing pulse, based on a latest half period measured at present and an anterior half period measured one half-period before the latest half period; an average-period generating step of generating an average half period of the latest and the anterior half periods when determined that no defect occurs whereas to generate a corrected average half period based on the latest half period and a plurality of anterior half periods measured before the latest half period when determined that the defect occurs; a reference period generating step of generating a reference half period that indicates a predetermined speed for the optical pickup to move over the optical disc; and a second moving step of moving the optical pickup at the predetermined speed based on the reference half period and the average half period or the corrected average half period.

DETAILED DESCRIPTION OF PREFERRED EMBODIMENTS

Preferred embodiments of an optical disc apparatus and an optical-pickup movement control method to be installed in an optical disc apparatus according to the present invention will be disclosed with reference to the attached drawings.

Figure 1:
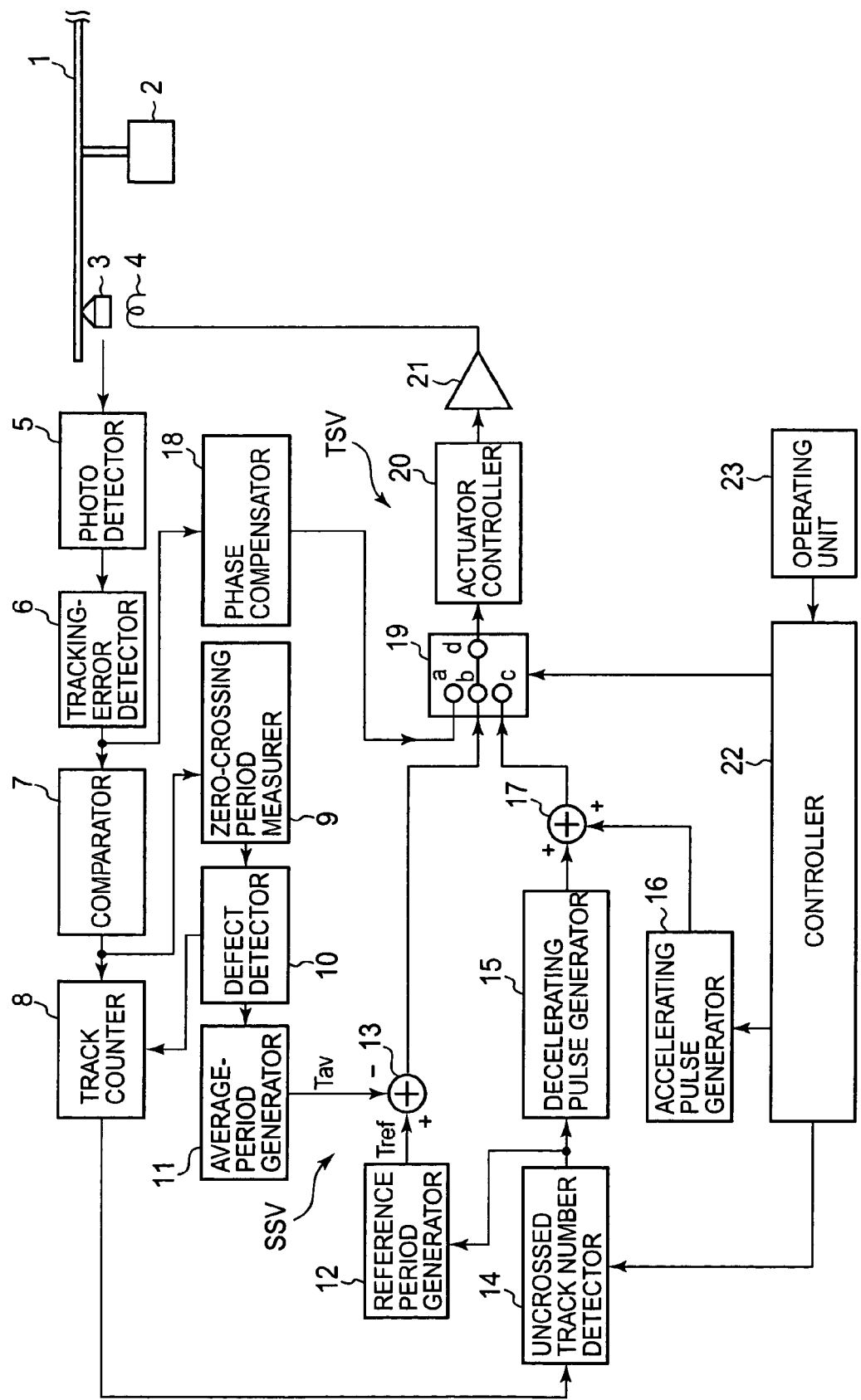
FIG. 1 shows a block diagram of a preferred embodiment of an optical disc apparatus according to the present invention.

FIG. 1 shows a block diagram of a preferred embodiment of an optical disc apparatus according to the present invention.

Disclosed first is tracking control in normal-mode recording or reproduction.

An optical disc 1 in FIG. 1 belongs to any standards, such as, CD, DVD, and Blu-ray (BD) standards. It is rotated by a spindle motor 2. An optical pickup 3 emits a light beam, such as a laser beam, onto the optical disc 1 in recording or reproduction. It is equipped with an objective lens (not shown) via which the light beam is converged into a light spot on tracks formed in a data-recording layer of the optical disc 1. The optical pickup 3 is movable over the optical disc 1 in the radius direction by a tracking actuator 4. Although not shown, the optical disc apparatus is equipped with a focus controller for light-spot focus control with distance adjustments between the objective lens of the optical pickup 3 and the optical disc 1.

A light beam emitted onto the optical disc 1 by the optical pickup 3 and reflected therefrom is received by a photo detector 5 having photo sensors, thus converted into an electric signal. The output signal of the photo detector 5 is supplied to a tracking-error detector 6. The detector 6 detects tracking error signals through pushpull, 3-beam tracking, etc. The tracking error signals are a constant signal of level 0 when a light beam accurately stays over a track whereas of a certain level in case of off track.

The tracking error signals are supplied to a phase compensator 18. The compensator 18 outputs tracking control signals so that the light spot can stay over the tracks while phase-compensating the tracking error signals. The tracking control signals are supplied to a switch 19. The switch 19 having terminals "a", "b", "c" and "d" is under control by a controller 22. In detail, the terminals "a" and "d" are connected to each other in the normal-mode recording or reproduction under control by the controller 22 so that the tracking control signals are supplied to an actuator controller 20. The controller 20 supplies control signals, via an amplifier 21, to the tracking actuator 4. The actuator 4 performs tracking control under control by the controller 20 so that the light spot can stay over the tracks.

As disclosed above, in normal-mode recording or reproduction, the optical disc apparatus performs tracking control with a loop constituted by the optical pickup 3, the photo detector 5, the tracking-error detector 6, the phase compensator 18, the switch 19, the actuator controller 20, the amplifier 21, and the tracking actuator 4. This loop is formed to create a tracking servo mechanism TSV. In this loop, the actuator 4, the controller 20, and the amplifier 21 constitute an optical-pickup moving mechanism to move the pickup 3.

Figure 2:
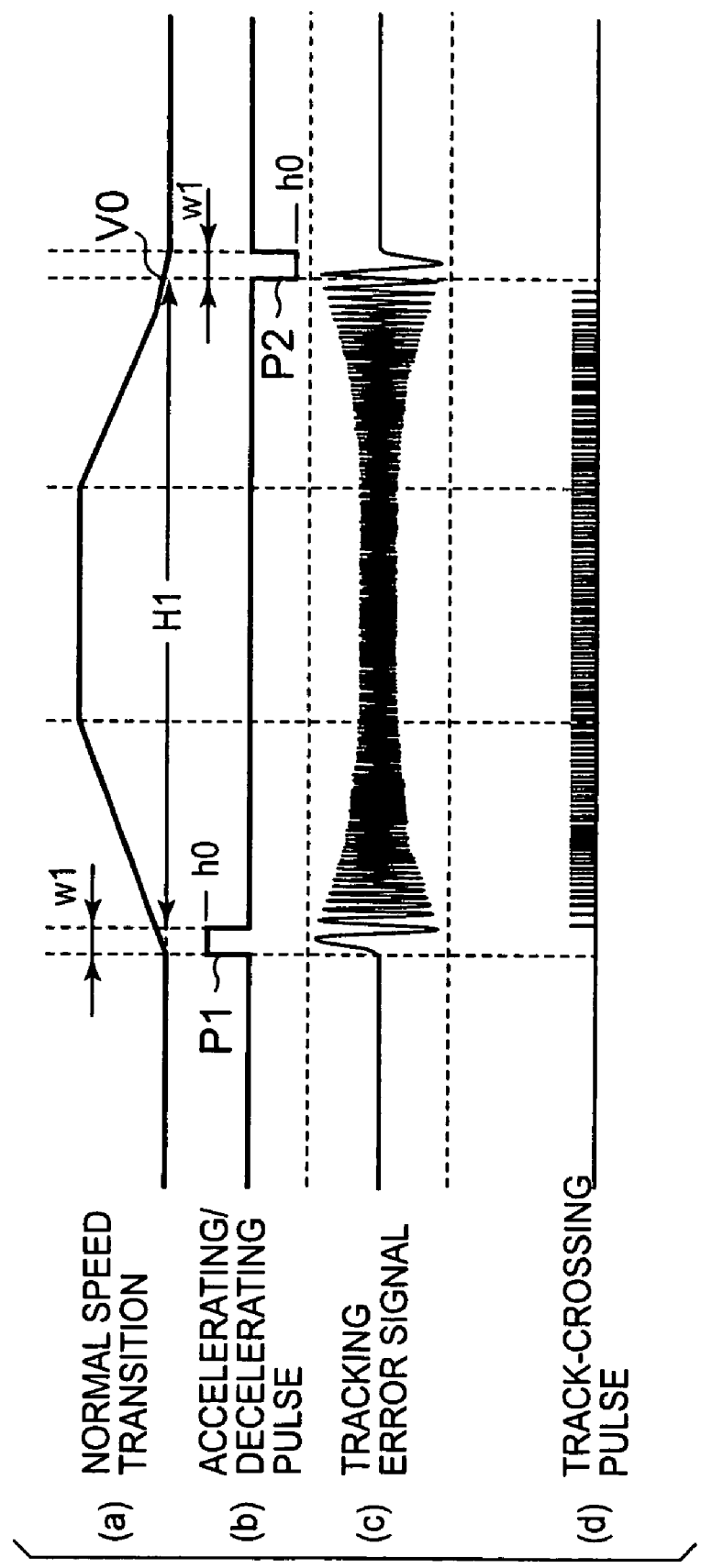
FIG. 2 shows waveforms for explaining multitrack jump performed by the optical disc apparatus shown in FIG. 1.

Described next with reference to FIG. 2 is multitrack jump performed by the optical disc apparatus shown in FIG. 1. Each abscissa axis in (a) to (d) of FIG. 2 indicates elapse of time. The ordinate axis in (a) of FIG. 2 indicates speed. Each ordinate axis in (b) to (d) of FIG. 2 indicates signal level.

Multitrack jump is performed, for example, when a user searches contents recorded on a track that is apart from the current track by several tracks via an operating unit 23 when the optical pickup 3 stays over the current track. When the user performs search via the operating unit 23, the controller 22 controls an accelerating pulse generator 16 to generate an accelerating pulse P1 such as shown in (b) of FIG. 2. The pulse P1 has a width "w1" and a positive level "h0". With the generation of the pulse P1, the controller 22 also controls the switch 19 so that the terminals "c" and "d" are connected to each other.

The accelerating pulse P1 is supplied to the actuator controller 20 through the terminals "c" and "d" of the switch 19. After the generation of the pulse P1, the controller 22 controls the switch 19 again so that the terminals "b" and "d" are connected to each other.

A waveform shown in (a) of FIG. 2 indicates a normal speed transition for the movement of the optical pickup 3. As shown in (a) of FIG. 2, after the accelerating pulse P1 is generated, the actuator controller 20 controls the tracking actuator 4, while the terminals "b" and "d" of the switch 19 are connected, so that the pickup 3 is controlled as follows: start moving; gradually accelerated; move at a constant speed when it has crossed a given number of tracks; and gradually decelerated when it has passed further a given number of tracks.

Stored in an uncrossed track number detector 14 from the controller 22 at the start of multijump is data on the number of tracks that the optical pickup 3 has to cross. Also stored in the detector 14 from a track counter 8 is data on the number of tracks the pickup 3, or the light spot, has already crossed, which will be described later in detail. Based on these number data, the detector 14 finds out the remaining number of tracks to be crossed to a target track. The remaining number data is then supplied to a reference period generator 12 and a decelerating pulse generator 15.

The decelerating pulse generator 15 generates a decelerating pulse P2 as shown in (b) of FIG. 2 at a moment of speed V0 at a track, for example, one track before a target track. The pulse P2 has a width "w1" and a negative level "h0". With the generation of the pulse P2, the controller 22 controls the switch 19 so that the terminals "c" and "d" are connected to each other. The pulse P2 is then supplied to the actuator controller 20 through an adder 17 and the terminals "c" and "d" so that the optical pickup 3 stops over the target track.

The light spot from the optical pickup 3 crosses tracks in multijump. A sign-wave tracking error signal, such as shown in (c) of FIG. 2, is generated whenever the light spot crosses a track. Track crossing pulses are then generated which correspond to the number of tracks the light spot has crossed. Each track crossing pulse rises at the rising side and falls at the falling side of a tracking error signal with respect to a zero crossing point in between. Shown in (d) of FIG. 2 are track crossing pulses indicated only at a moment at which each pulse rises with respect the zero crossing point. The track crossing pulses are counted to obtain the number of remaining tracks (to a target track) the light spot has to cross.

A period H1 indicated in (a) of FIG. 2 is from a moment just after the generation of the accelerating pulse P1 to another moment just before the generation of the decelerating pulse P2. It is the period for speed control of the optical pickup 3 according to the normal speed transition shown in (a) of FIG. 2. During this period, the terminals "b" and "d" of the switch 19 are connected to each other. When a defect occurs to reproduced signals (tracking error signals), speed control of the optical pickup 3 cannot performed accurately due to phase shift, drop-outs, etc., of track crossing pulses.

Disclosed next with reference to FIGS. 3 to 7 are operations of the optical disc apparatus (FIG. 1) when reproduced signals (tracking error signals) suffer from a defect already discussed.

Figure 3:
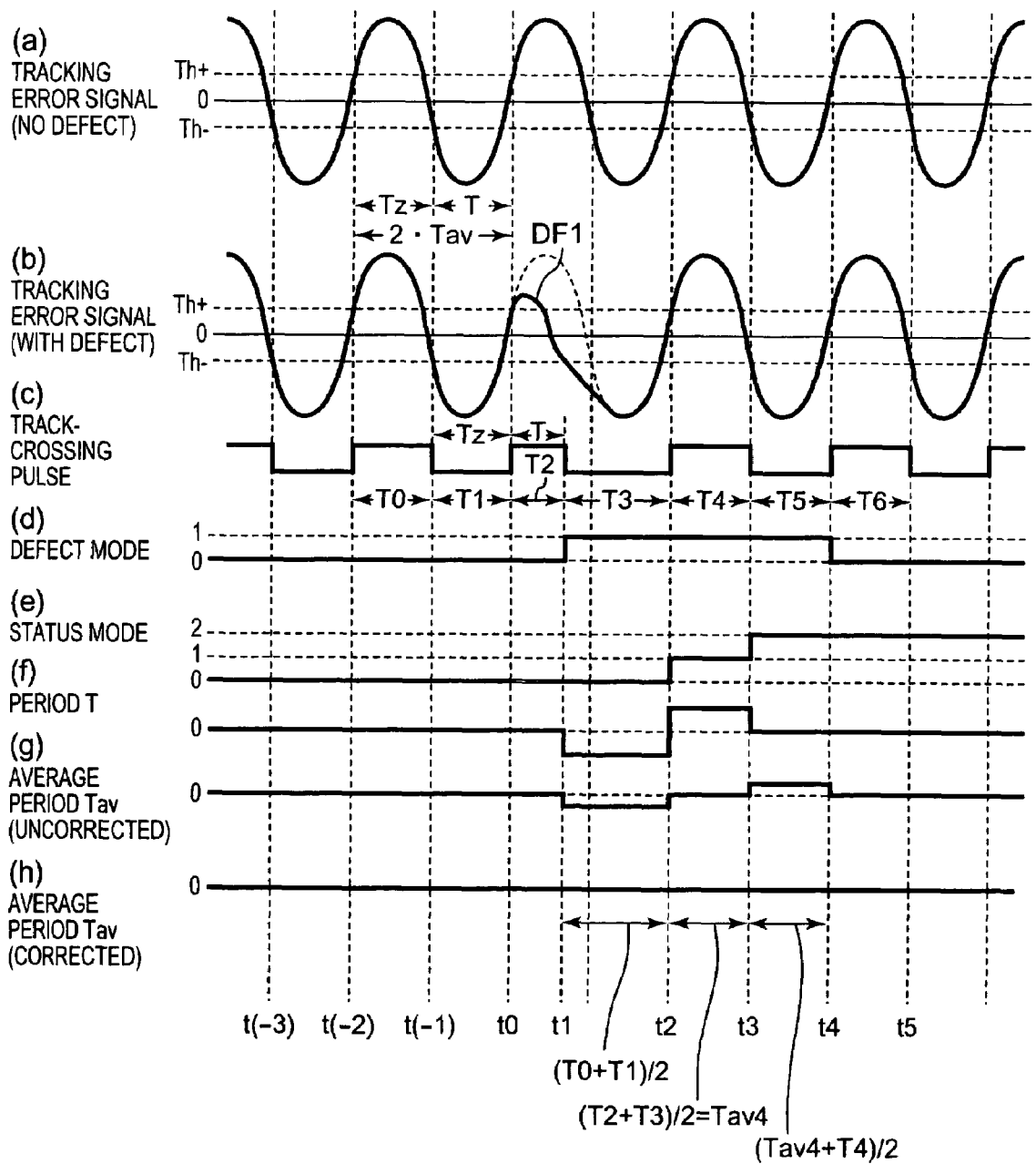
FIG. 3 illustrates a correction procedure to be performed when a defect is in a first state according to the present invention.

Shown in (a) of FIG. 3 are tracking error signals with no defects whereas shown in (b) of the same figure are those with a defect DF1. Tacking error signals output from the tacking error detector 6 are supplied to a comparator 7. In multijump, track crossing pulses are generated based on zero crossing points of the tracking error signals, as described with respect to FIG. 2. However, the track crossing pulses suffer instability in rising and/or falling when the level of the tracking error signals varies due to noises occurring at or in the vicinity of zero crossing points. To avoid adverse effects of such noises, the comparator 7 (a track-crossing pulse generator) generates track crossing pulses using upper and lower threshold levels "Th+" and "Th−", in this embodiment.

Shown in (c) of FIG. 3 are track crossing pulses generated based on the tracking error signals shown in (b) of the same figure. Each pulse rises and falls when the signal level in (b) of FIG. 3 reaches the upper threshold level "Th+" and the lower threshold level "Th−", respectively.

In (b) of FIG. 3, the defect DF1 occurs such that a portion of tracking error signals has a lower signal level than a normal level (with no defects) indicated by a dot line. The defect DF1 causes the tracking error signal to suffer out of timing in reaching the lower threshold level "Th−", hence the corresponding track crossing pulse to suffer variation in pulse width: a shorter period T2 between moments t0 to t1 whereas a longer period T3 between moments t1 to t2. Other possible cases due to defects are (although not shown): variation in pulse width due to out of timing in reaching the upper threshold level "Th+", a longer period T2 whereas a shorter period T3, etc.

Shown in FIG. 3 is a first case to be corrected in which the defect DF1 causes out of timing in reaching the threshold level "Th+" (or "Th−"), although a defect-suffered tracking error signal goes beyond this level, so that the pulse width (a half period) of a track crossing pulse deviates from a reference normal width (a half period).

In general, the rotation linear velocity of the optical disc 1 is higher than the track crossing velocity of a light spot. Such a velocity difference makes a light spot pass a damaged or dirty area of the disc 1 in a comparatively short time unless the area is large. This implies that most defects occur to tracking error signals for a period, generally, equal to or shorter than the period for a light spot to cross one track.

Track crossing pulses generated by the comparator 7 are supplied to the track counter 8. The counter 8 counts the number of the input pulses and sends count data to the uncrossed track number detector 14. The count data indicates the number of tracks the light spot has crossed or passed.

The track crossing pulses are also supplied to a zero-crossing period measurer 9. Strictly speaking, the track crossing pulses shown in (c) of FIG. 3 are not generated based on the zero crossing points of tracking error signals, because they are generated based on the threshold levels "Th+" and "Th−", as discussed above. The pulses shown in (c) of FIG. 3 are, however, substantially identical to those generated based on the zero crossing points in terms of the fact that both are the pulses that correspond to the number of tracks the light spot has passed, although rising and/or falling timings are different between the pulses generated based on the zero crossing points and those based on the threshold levels "Th+" and "Th−". In this respect, a period of one track crossing pulse is defined as a zero crossing period (interval) T. Although, the period measurer 9 measures a half period T/2 in this embodiment, T/2 is expressed as T for easiness in the disclosure and the drawings, hereinafter.

Zero crossing periods T measured by the zero-crossing period measurer 9 are supplied to a defect detector 10. Based on the periods T sequentially supplied by the measurer 9, the detector 10 determines whether and what defects occur to the tracking error signals, which will be described later in detail.

The output of the defect detector 10 is supplied to a average-period generator 11. Based on the zero crossing periods T sequentially supplied, the generator 11 calculates an average half period Tav of two consecutive half periods when no defects occur whereas a corrected average half period Tav for a predetermined period when a defect occurs. The calculations will be described later in detail. An average half period Tav is termed as an average period Tav hereinafter.

An average period Tav is then supplied to an adder 13. Also supplied to the adder 13 is a reference period (half period) Tref from a reference period generator 12. Supplied to the generator 12 is the number of uncrossed tracks to a target track from the uncrossed track number detector 14. The generator 12 is provided with a table listing several reference periods (half periods) Tref to gain a predetermined normal speed transition such as shown in (a) of FIG. 2. Then, the generator 12 outputs a reference period (half periods) Tref that indicates a predetermined normal speed in the normal speed transition, depending on the number of uncrossed tracks supplied by the detector 14. The adder 13 subtracts the average period Tav from the reference period Tref and outputs differential data.

The differential data is supplied to the actuator controller 20 via the switch 19. Based on the differential data, the controller 20 drives the tracking actuator 4 via the amplifier 21.

As disclosed above, the optical disc apparatus (FIG. 1) has two paths. A first path is constituted by the optical pickup 3, the photo detector 5, the tracking-error detector 6, the comparator 7, the track counter 8, the uncrossed track number detector 14, and the reference period generator 12. A second path (separated from the first path at the output of the comparator 7) is constituted by the zero-crossing period measurer 9, the defect detector 10, and the average-period generator 11.

A serve control is performed so that the adder 13 outputs differential data of zero for the period H1 indicated in (b) of FIG. 2 from a moment just after the generation of the accelerating pulse P1 to another moment just before the generation of the decelerating pulse P2. The optical pickup 3 is moved under the serve control with the normal speed transition shown in (a) of FIG. 2. The serve control is achieved with a normal-speed-transition movement servo mechanism SSV with the loop constituted by the first and second paths described above and the adder 13, the switch 19, the actuator controller 20, the amplifier 21, and the tracking actuator 4.

The normal-speed-transition movement servo mechanism SSV handles the average period Tav, not the period T, to effectively cover period variation in tracking error signals and track crossing pulses.

The defect detector 10 and the average-period generator 11 are disclosed more in detail with reference to FIG. 3.

A period T (actually T/2) currently measured (the latest period T) by the zero-crossing period measurer 9 for the current track crossing pulse is supplied to the defect detector 10 and then the average-period generator 11.

When the currently-measured period T is input, the defect detector 10 has stored an anterior period Tz (actually Tz/2) measured ½-period before the current period T. The detector 10 determines whether a difference between the currently-measured period T and the anterior period Tz measured ½-period before falls in a specific range ΔT (error variation) according to the following relationship:

$$(Tz-\Delta T)<T<(Tz+\Delta T) \tag{1}$$

The tracking error signals do not have a perfect sign waveform but a varying waveform. The period T of the track crossing pulses thus varies among the pulses. The relationship (1) is used in determining whether the periods T and Tz fall in a variation acceptable range. The error variation ΔT can be determined under consideration of S/N in the tracking error signals, inherent errors in the optical disc 1, such as, servo errors attributed to disc formation requirements, etc.

When the relationship (1) is satisfied, the defect detector 10 sets a defect mode to zero that indicates that no noticeable defects occur to the tracking error signals which could give adverse effects to the normal-speed-transition movement servo mechanism SSV.

The tracking error signals shown in (b) of FIG. 3 do not suffer defects until a moment t0, thus satisfying the relationship (1). The defect mode is thus at 0 until the moment t0 (strictly, until a moment t1), as shown in (d) of FIG. 3.

When the defect DF1 occurs after the moment t0, the currently-measured period T becomes shorter than the anterior period Tz measured ½-period before the period T, thus not satisfying the relationship (1).

When the relationship (1) is not satisfied, the defect detector 10 determines whether the currently-measured period T is shorter than about 2 times the anterior period Tz measured ½-period before according to the following relationship:

$$T<(2\cdot Tz-\Delta T) \tag{2}$$

The sign ΔT is identical to that in the relationship (1).

When the relationship (2) is satisfied, the defect detector 10 assumes that, although there are no drop-outs in the track crossing pulses, the period T of a particular track crossing pulse becomes much shorter or longer than a normal one due to the defect DF1 with decrease in level to a particular tracking error signal.

The defect detector 10 sets the defect mode to 1 when the relationship not (1) but (2) is satisfied. As shown in (d) of FIG. 3, the defect mode is set to 1 when the defect DF1 is detected at the moment t1. The defect mode is kept at 1 until elapse of three ½-periods, once it is set at 1. It is then reset to 0 at a moment t4, as shown in (d) of FIG. 3, in this embodiment.

Also implemented in the defect detector 10 in this embodiment is a status mode that indicates the current status or condition with respect to defects. The detector 10 sets the status mode to a DF1 mode when the defect DF1 occurs whereas a DF2 mode when a defect DF2 occurs which will be discussed later. The DF1 and DF2 modes are different and take a level 0, 1 or 2, which will be discussed later.

Shown in (f) of FIG. 3 is a pulse-like waveform that indicates change in the period T: a level below 0 for a shortened period T; and a level above 0 for an elongated period T.

When the defect DF1 occurs as shown in (b) of FIG. 3, the pulse-like waveform (period T) in (f) of the same figure: goes below the level 0 at the moment t1 from this level at which it has lied until the moment t1 due to a shorter period T2 of the track crossing pulse suffering the defect DF1 between the moments t0 to t1; goes above the level 0 at the moment t2 due to a longer period T3 between moments t1 to t2; and returns to the level 0 at a moment t3. The level 0 in (f) of FIG. 3 indicates that the period T is constant before the moment t0 and after the moment t3 for easier illustration, although, strictly speaking, there are small variations in the period T before and after these moments.

Supplied to the average-period generator 11 are a series of currently-measured periods T. When each currently-measured period T is supplied, the generator 11 has stored at least an anterior period Tz (actually Tz/2) measured ½-period before the current period T and another period measured ½-period before the anterior period Tz.

The average-period generator 11 calculates an average period Tav of two consecutive periods T (actually ½ periods), or the currently-measured period T and the anterior period Tz measured ½-period before the current period T. Shown in (g) of FIG. 3 is a square waveform that indicates change in the average period Tav due to change in the period T of the defect-suffered track crossing pulse in (c) of FIG. 3. The waveform in (g) of FIG. 3 indicates the defect-suffered average period Tav that is not subjected to an average-period correction procedure according to the present invention which will be disclosed later in detail.

Average periods Tav of the track crossing pulses that suffer the defect DF1 calculated at several moments in the same way as normal track crossing pulses (with no defects) are as follows:

an average period Tav (at the moment t1) of a period T1 between a moment t(−1) and the moment t0 and a period T2 between the moments t0 and t1: shorter than a normal average period Tav;

an average period Tav (at the moment t2) of the period T2 between the moments t0 and t1 and a period T3 between the moments t1 and t2: almost equal to the normal average period Tav; and an average period Tav (at the moment t3) of the period T3 between the moments t1 and t2 and a period T4 between the moments t2 and t3: longer than the normal average period Tav.

The average-period correction procedure to correct such abnormal average periods according to the present invention executed by the average-period generator 11 will be disclosed in detail.

Shown in (h) of FIG. 3 is a waveform of the average period Tav subjected to the average-period correction procedure according to the present invention for the abnormal average-period sections in (g) of FIG. 3.

Average periods Tav of the track crossing pulses that suffer the defect DF1 calculated at several moments under the average-period correction procedure according to the present invention are as follows:

Calculated at the moment t1 is an average period Tav between a period T0 from a moment t(−2) to the moment t(−1) and the period T1 from the moments t(−1) to t0. The periods T0 and T1 are not suffered with no defects different from the period T1 and the period T2 used in the calculation of the average period Tav at the moment t1 in the same way as normal track crossing pulses as discussed above.

Calculated at the moment t2 is an average period Tav between the period T2 from the moments t0 to t1 and the period T3 from the moments t1 to t2 due to the fact that a normal average period Tav is gained. The average period Tav calculated at the moment t2 is termed as an average period Tav4.

The average-period generator 11 stores the calculated average period Tav4. The generator 11 also calculates an average period Tav at the moment t3 of the average period Tav4 and period T4 between the moments t2 and t3.

As disclosed, the abnormal average periods in the defect mode 1 are corrected as substantially identical to the normal average periods for the period from the moments t1 to t4 under the average-period correction procedure according to the present invention.

Therefore, the average-period generator 11 outputs the corrected average periods Tav, even if the tracking error signals suffer the defect DF1, which are substantially identical to the normal average period with no defects.

The average-period correction procedure according to the present invention achieves correction of average periods Tav when the defect DF1 occurs over at least four ½ periods.

Figure 4:
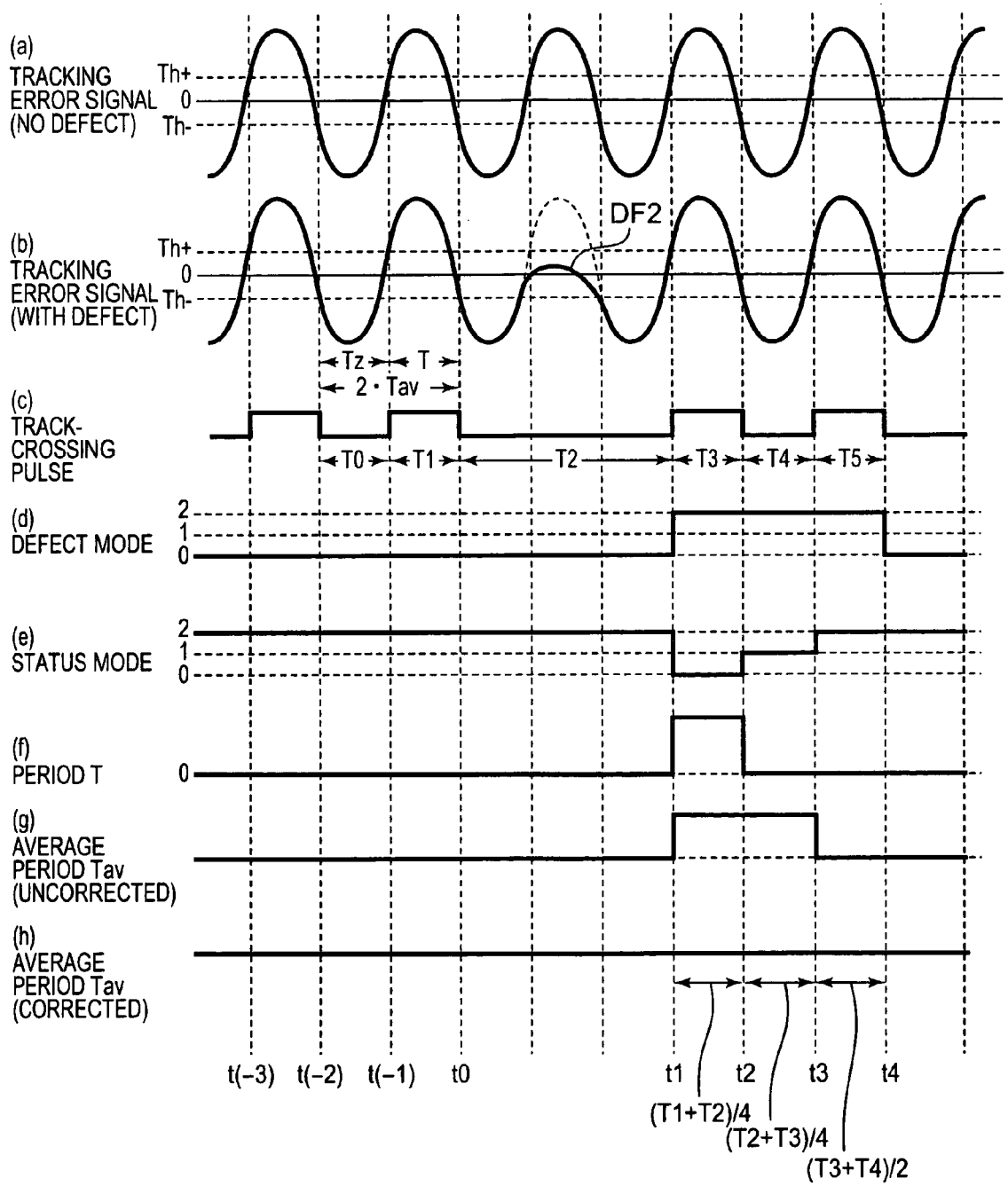
FIG. 4 illustrates a correction procedure to be performed when a defect is in a second state according to the present invention.

Disclosed next with reference to FIG. 4 is the average-period correction procedure according to the present invention in case of drop-outs of track crossing pulses.

Shown in (a) of FIG. 4 are tracking error signals with no defects whereas shown in (b) of the same figure are those with a defect DF2. The defect DF2 causes decrease in level of the tracking error signals in which a signal portion does not go beyond the threshold level "Th+" (or "h−"). This results in drop-outs of track crossing pulses in the period that suffers from the defect DF2.

FIG. 4 shows a second case to be corrected in which the defect DF2 causes decrease in level of the tracking error signals in which a signal portion does not go beyond the threshold level "Th+" or "Th−".

Two or more of pluses could be dropped out from track crossing pulses when tracking error signals suffer defects for a longer period. Such a possibility is, however, very low in multitrack jump.

Thus, the average-period correction procedure in the DF1 mode described above and also the average-period correction procedure in the DF2 mode which is described below can handle abnormal track crossing pulses caused by defects usually occur in multitrack jump.

The defect detector 10 sets the defect mode to 2 when the relationship (2) is not satisfied. As shown in (d) of FIG. 4, the defect mode is set to 2 at the moment t1. The defect mode is kept at 2 for three ½-periods, once it is set at 2. It is then reset to 0 at a moment t4.

The defect detector 10 sets the status mode to 2 (a DF2 mode) when the defect DF2 occurs, as shown in (e) of FIG. 4. The reason why the status mode is at 2 before a moment t1 and this status mode will be discussed later in detail.

Shown in (f) of FIG. 4 is a pulse-like waveform, like in (f) of FIG. 3, indicates change in the period T: a level below 0 for a shortened period T; and a level above 0 for an elongated period T.

When the defect DF2 occurs as shown in (b) of FIG. 4, the pulse-like waveform (period T) in (f) of the same figure: goes above the level 0 at the moment t1 from this level at which it has lied until the moment t1, due to drop-outs of the track crossing pulses from the moments t0 to t1; and returns to the level 0 at the moment t2. Like in (f) of FIG. 3, the level 0 in (f) of FIG. 4 indicates that the period T is constant before the moment t1 and after the moment t2 for easier illustration, although, strictly speaking, there are small variations in the period T before and after these moments.

Shown in (g) of FIG. 4 is a waveform, like (g) of FIG. 3, that indicates change in the average period Tav due to change in the period T of the defect-suffered track crossing pulse in (b) of FIG. 4. The waveform in (g) of FIG. 3 indicates variation in the average period Tav, due to one track crossing pulse being dropped out, that is not subjected to an average-period correction procedure according to the present invention which will be disclosed later in detail.

Average periods Tav of the track crossing pulses that suffer the defect DF2 calculated at several moments in the same way as normal track crossing pulses (with no defects) are as follows:

an average period Tav (at the moment t1) of a period T1 between a moment t(−1) and the moment t0 and a period T2 between the moments t0 and t1: longer than a normal average period Tav; and an average period Tav (at the moment t2) of the period T2 between the moments t0 and t1 and a period T3 between the moments t1 and t2: longer than the normal average period Tav; and The average-period correction procedure to correct such abnormal average periods according to the present invention executed by the average-period generator 11 will be disclosed in detail.

Shown in (h) of FIG. 4 is a waveform of the average period Tav subjected to the average-period correction procedure according to the present invention for the abnormal average-period sections in (g) of FIG. 4.

Average periods Tav of the track crossing pulses that suffer the defect DF2 calculated at several moments under the average-period correction procedure according to the present invention are as follows:

an average period Tav at the moment $t1$=(the period $T1$+the period $T2$)/4;

an average period Tav at the moment $t2$=(the period $T2$+the period $T3$)/4; and an average period Tav at the moment t3=(the period T3+a period T4)/2.

The period T4 is from the moment t2 to a moment t3. The average period Tav at the moment t1 may be obtained as the period T2/3, as shown in (c) of FIG. 4. However, the above is a more feasible way to compensate for variation in the track crossing pulses in the time domain.

As disclosed, the abnormal average periods in the defect mode 2 are corrected as substantially identical to the normal average period for the period from the moments t1 to t4 under the average-period correction procedure according to the present invention.

Therefore, the average-period generator 11 outputs the corrected average periods Tav, even if the tracking error signals suffer the defect DF2, which are substantially identical to the normal average periods with no defects.

The average-period correction procedure according to the present invention achieves correction of average periods Tav when the defect DF2 occurs over at least four ½ periods.

When one track crossing pulse is dropped out as shown in (c) of FIG. 4, the number of track crossing pulses counted by the track counter 8 is inevitably one smaller than the actual number of tracks the spot light has crossed. To avoid such a problem, the counter 8 counts up 1 whenever the defect mode is set to 2 at the defect detector 10 (FIG. 1).

In the block diagram of FIG. 1, the functions of the zero-crossing period measurer 9, the defect detector 10, and the average-period generator 11 can be achieved with either the hardware or software. It is also true for the other units. In other words, the optical disc apparatus shown in FIG. 1 can be achieved with combination of the hardware and software.

Figure 5:
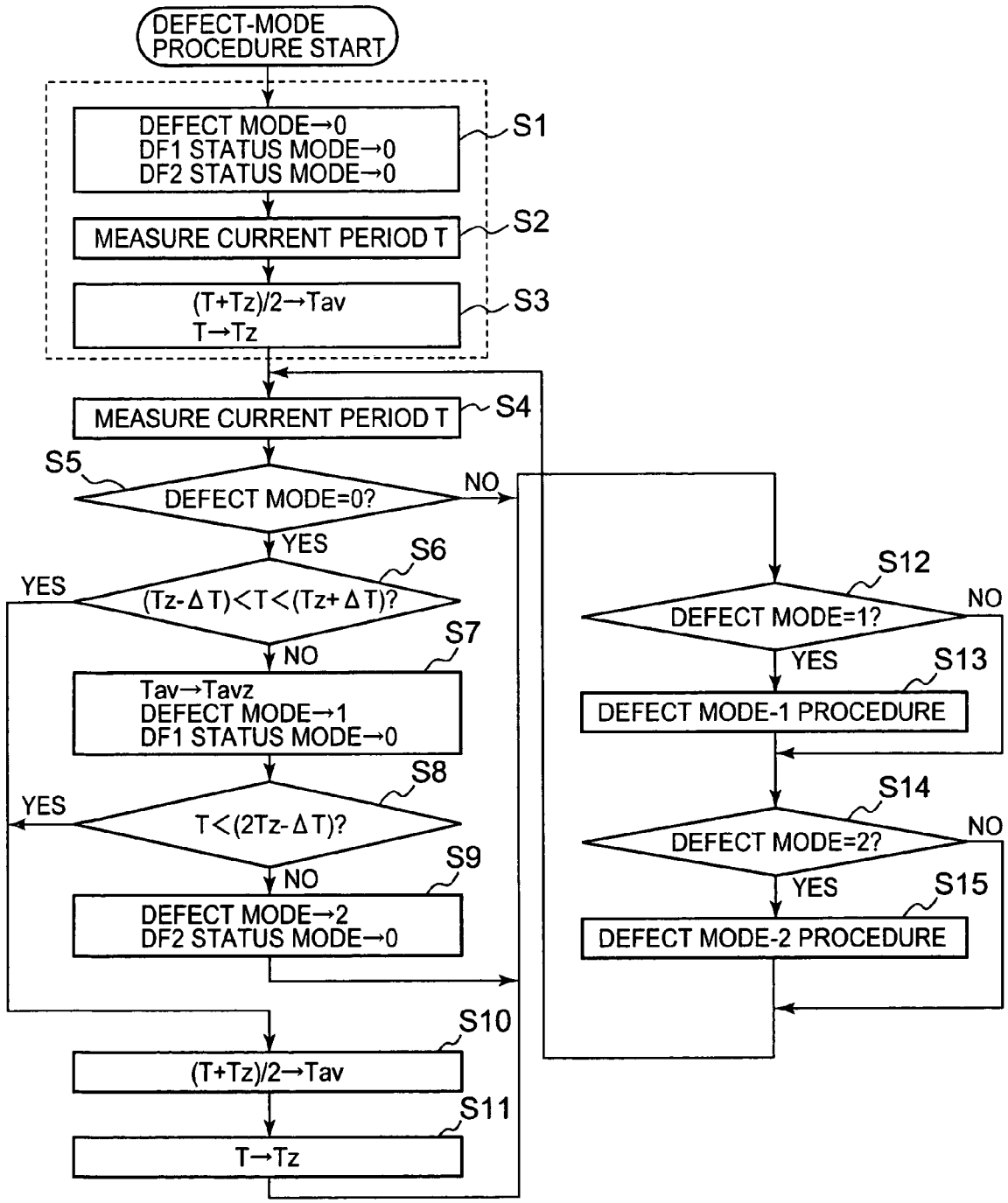
FIG. 5 shows a flowchart indicating detection of defects and a correction procedure according to the present invention.
Figure 6:
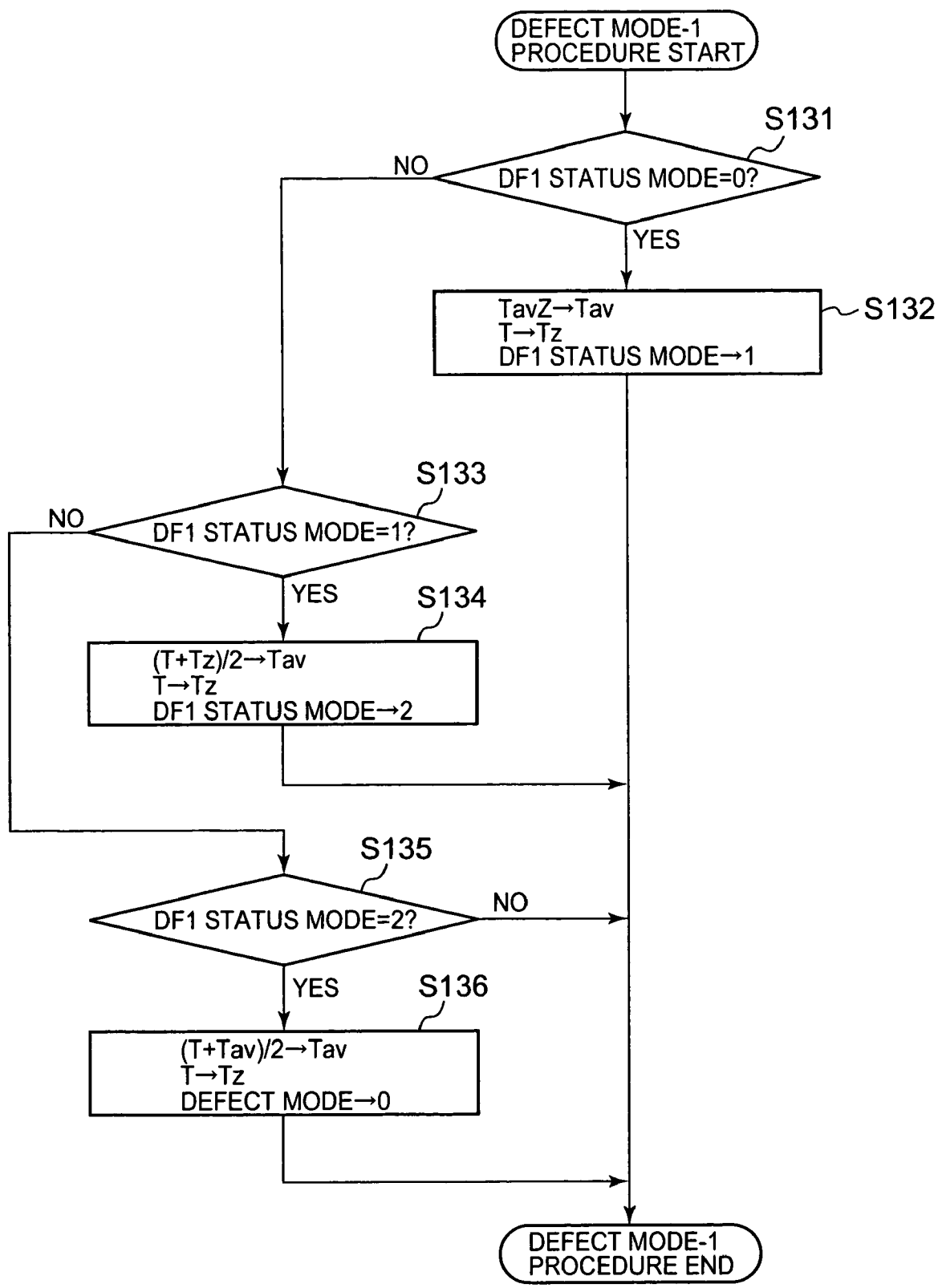
FIG. 6 shows a flowchart indicating a correction procedure to be performed when a defect is in the first state illustrated in FIG. 3 according to the present invention.
Figure 7:
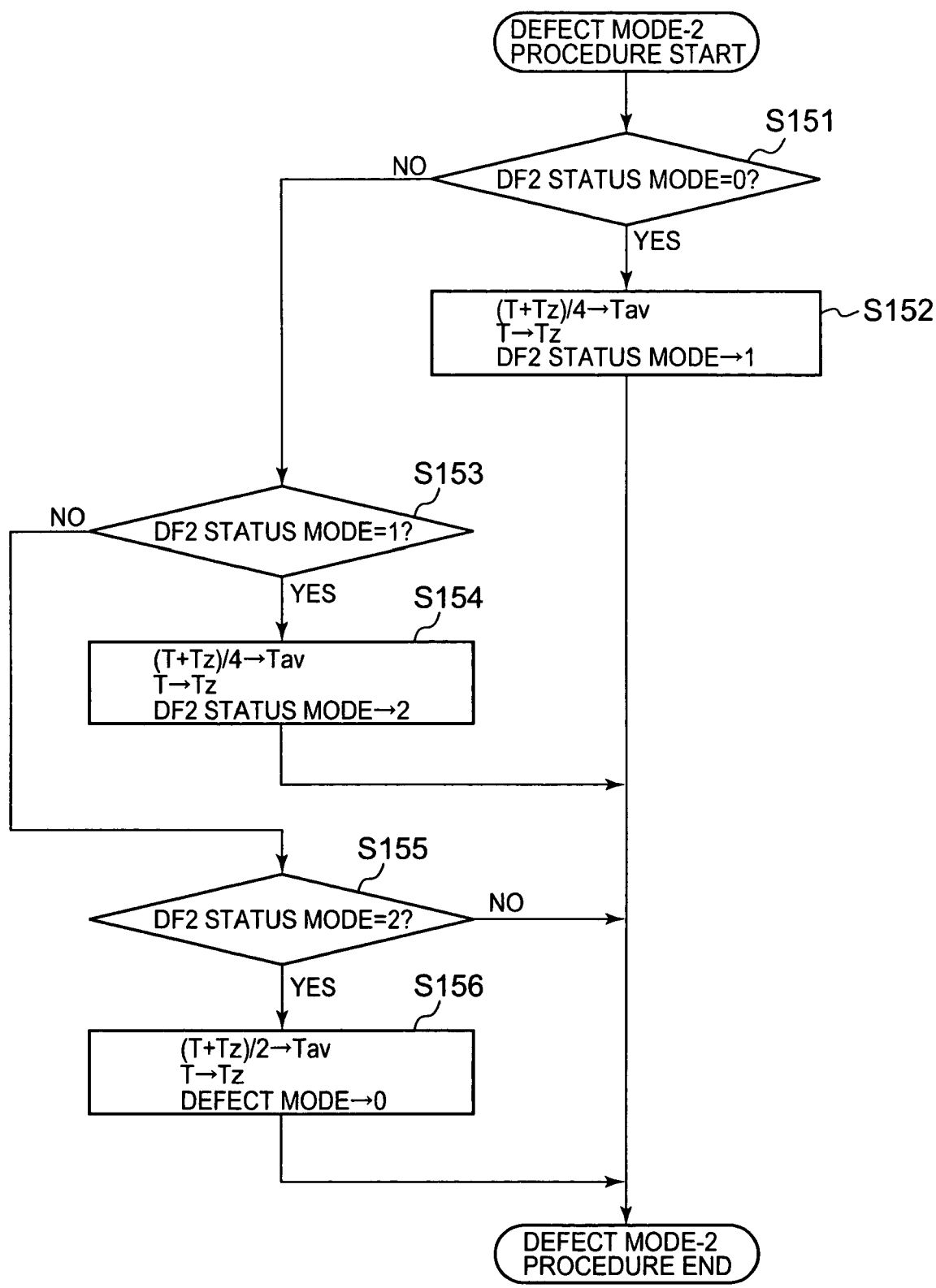
FIG. 7 shows a flowchart indicating a correction procedure to be performed when a defect is in the second state illustrated in FIG. 4 according to the present invention.

Disclosed more in detail with reference to flowcharts in FIGS. 5 to 7 are the functions of the zero-crossing period measurer 9, the defect detector 10, and the average-period generator 11. The procedure shown in FIG. 5 is performed by the combination of the measurer 9, the detector 10, and the generator 11. The procedures shown in FIGS. 6 and 7 are performed by the combination of the detector 10 and the generator 11.

The flowchart shown in FIG. 5 is a defect-mode procedure which is executed when the optical pickup 3 starts to move according to the normal speed transition for the period H1 shown in (a) of FIG. 2.

When the defect-mode procedure is executed, the defect mode and the DF1 and DF2 status modes are all set to 0 in step S1. The current period T is then measured in step S2. Next in step S3, an average period Tav is calculated based on the currently-measured period T and an anterior period Tz measured ½-period before the current period T, the anterior period Tz being updated to the currently-measured period T after the calculation (the current period T is used as the anterior period Tz in the next calculation). The updating is performed whenever a track crossing pulse is generated and before the step S2 to measure a succeeding period T. The procedure from the steps S1 to S3 is an initialization procedure before a defect-mode determination procedure.

The succeeding and thus the current period T is measured when the succeeding track crossing pulse is generated in step S4. It is determined whether the defect mode is 0 in step S5. The defect mode is 0 just after the initialization procedure (steps S1 to S3). It is thus determined as 0 (YES), and the procedure goes to step S6. It is determined whether the period T satisfies the relationship (1) in step S6. The DF1 and DF2 status modes are 0 just after the initialization procedure. It is thus determined that the relationship (1) is satisfied (YES), and the procedure goes to step S10. An average period Tav is calculated in step S10 based on the currently-measured period T and an anterior period Tz measured ½-period before the current period T. The anterior period Tz is updated to the currently-measured period T in step S11. Or, the current period T is used as the anterior period Tz in the next calculation. Steps S7 to S9 will be disclosed later in detail.

It is then determined whether the defect mode is 1 in step S12. The defect DF1 has not occurred yet and hence the defect mode is determined as 0 (NO). The procedure goes to step S14 to determine whether the defect mode is 2. The defect DF2 has not occurred yet and hence the defect mode is determined as 0 (NO). The procedure returns to step S4 when the succeeding track crossing pulse is generated.

The foregoing procedure is repeated as long as both of the defects DF1 and DF2 do not occur. Under this procedure, the average-period generator 11 outputs an average period Tav of the currently-measured period T and the anterior period Tz measured ½-period before the current period T whenever a track crossing pulse is generated.

When either the defect DF1 or DF2 occurs, it is determined that the period T does not satisfy the relationship (1) in step S6 (NO). Next, in step S7, the current average period Tav is replaced by an anterior average period Tavz calculated just before the current average period Tav and to be used in a defect mode-1 procedure in step S13, with the defect mode and the DF1 status mode being set to 1 and 0, respectively. The average-period replacement is performed so that the average period Tav calculated in step S10 is stored up to the generation of the succeeding track crossing pulse. The DF1 status mode is set to 0 for a possibility in that this status mode is 2 in step S13.

Next, in step S8, it is determined whether the period T satisfies the relationship (2). The procedure goes to step S10 when the relationship (2) is satisfied (YES) which indicates that the defect DF1 occurs to the tracking error signals. In contrast, the procedure goes to step S9 when the relationship (2) is not satisfied (NO) which indicates that the defect DF2 occurs to the tracking error signals. In step S9, the defect mode and the DF2 status mode are set to 2 and 0, respectively.

Accordingly, in this procedure, when the relationship (1) is not satisfied (NO) in step S6, it is assumed that the defect DF1 occurs, and hence the detect mode is set to 1 in step S7. Then, the detect mode is kept at 1 or switched to 2, depending on the determination in step S8 of whether the relationship (2) is satisfied or not.

When it is determined that the relationship (2) is satisfied (YES) in step S8, the detect mode is kept at 1, and the procedure goes to step S12 through steps S10 and S11. In step S12, it is determined whether the detect mode is 1. Since the detect mode is kept at 1 (YES), the procedure goes to step S13 to execute the defect mode-1 procedure which will be described later.

In contrast, when it is determined that the relationship (2) is not satisfied (NO) in step S8, the detect mode is switched to 2 in step S9, and the procedure directly goes to step S12. Since the detect mode is 2, it is determined that the detect mode is not 1 (NO) in step S12, and the procedure goes to step S14. It is determined whether the defect mode is 2 in step S14. Since the defect mode is 2 (at step S9), it is determined that the detect mode is 2 (YES) in step S14, and the procedure goes to step S15 to execute a defect mode-2 procedure which will be described later.

The defect mode-1 procedure (step S13) will be described in detail with reference to FIG. 6.

It is determined whether the DF1 status mode is 0 in step S131. Since the DF1 status mode is 0 (at step S7, FIG. 5), it is determined that DF1 status mode is 0 (YES), and the procedure goes to step S132. Used in step S132 is not the current average period Tav but the anterior average period Tavz (calculated just before the current average period Tav) stored in step S7. This corresponds to calculation of the average period Tav by (T0+T1)/2, not (T1+T2)/2, for the period from the moments t1 to t2 in FIG. 3. Also executed in step S132 are that the anterior average period Tavz is updated to the current average period Tav and the DF1 status mode is switched to 1.

Step S132 is completed, and the procedure goes to step S14 (FIG. 5) to determine whether the defect mode is 2. Since after the defect mode-1 procedure, the defect mode is not 2 (NO) in step S14. The procedure goes to step S4 to measure the current period T when the succeeding track crossing pulse is generated, followed by step S5 in which the defect mode is not determined as 0 (NO). The procedure goes to step S12 and then again step S13 (defect mode-1 procedure).

In step S131 (FIG. 6), the DF1 status mode is not determined as 0 (NO), then in step S133, the DF1 status mode is determined as 1 (YES) due to being set to 1 in step S132 in the former procedure. Then, in step S134, the average period Tav is calculated between the current period T and the anterior period Tz (½ period before T). This corresponds to calculation of the average period Tav by (T2+T3)/2 for the period from the moments t2 to t3. Also executed in step S132 are that the anterior period Tz is updated to the current period T and the DF1 status mode is switched to 2.

Step S134 is completed, and the procedure goes to step S14 (FIG. 5) to determine whether the defect mode is 2. Since after the defect mode-1 procedure, the defect mode is not 2 (NO) in step S14, the procedure goes to step S4 to measure the current period T when the succeeding track crossing pulse is generated, followed by step S5 in which the defect mode is determined as not 0 (NO). The procedure goes to step S12 and then again step S13 (defect mode-1 procedure).

In step S131 (FIG. 6), the DF1 status mode is not determined as 0 (NO), then in step S133, the DF1 status mode is not determined as 1 (YES) due to being set to 2 in step S134 in the former procedure. Then, in step S135, it is determined whether the DF1 status mode is 2. It is determined as 2 (YES). Next in step S136, a new average period Tav is calculated between the current period Ta and the average period Tav obtained in the preceding calculation. This corresponds to calculation of the average period Tav by (Tav4+T4)/2 for the period from the moments t3 to t4 in FIG. 3. Also executed in step S136 are that the anterior period Tz is updated to the current period T and the defect mode is reset to 0. The defect mode-1 procedure is completed.

Described next with reference to FIG. 7 is the defect mode-2 procedure in step S14 of FIG. 5.

It is determined whether the DF2 status mode is 0 in step S151. Since the DF2 status mode is 0 (at step S9, FIG. 5), it is determined that DF1 status mode is 0 (YES), and the procedure goes to step S152. Calculated here is the average period Tav obtained in a manner that the current period T and the anterior period Tz (one ½-period before the current period T) are added and divided by 4. This corresponds to calculation of the average period Tav by (T1+T2)/4, not (T1+T2)/2, for the period from the moments t1 to t2 in FIG. 4. Also executed in step S152 are that the anterior period Tz is updated to the current period T and the DF2 status mode is switched to 1.

Step S152 is completed, and the procedure goes to step S4 to measure the current period T when the succeeding track crossing pulse is generated, followed by step S5 in which the defect mode is not determined as 0 (NO). The procedure goes to step S14 via step S12 and then again step S15 (defect mode-2 procedure).

In step S151 (FIG. 7), the DF2 status mode is not determined as 0 (NO), then in step S153, the DF2 status mode is determined as 1 (YES) due to being set to 1 in step S152 in the former procedure. Then, in step S154, the average period Tav is calculated in a manner that the current period T and the anterior period Tz (one ½-period before the current period T) are added and divided by 4. This corresponds to calculation of the average period Tav by (T2+T3)/4 for the period from the moments t2 to t3. Also executed in step S154 are that the anterior period Tz is updated to the current period Ta and the DF2 status mode is switched to 2.

Step S154 is completed, and the procedure goes to step S4 (FIG. 5) to measure the current period T when the succeeding track crossing pulse is generated, followed by step S5 in which the defect mode is determined as not 0 (NO). The procedure goes to step S14 via step S12 and then again step S15 (defect mode-2 procedure).

It is determined whether the DF2 status mode is 0 in step S151. Since the DF2 status mode is 2 in the former procedure (at step S154), it is determined that the DF2 status mode is not 0 (NO). Also, in step S153, the DF2 status mode is not determined as 1 (NO). The procedure goes to step S155 to determine whether the DF2 status mode is 2. The DF2 status mode is determined as 2 (YES). The procedure goes to step S156. Calculated here is the average period Tav of the current period T and the anterior period Tz (one ½-period before the current period T). This corresponds to calculation of the average period Tav by (T3+T4)/2 for the period from the moments t3 to t4 in FIG. 4. Also executed in step S156 are that the anterior period Tz is updated to the current period T and the defect mode is reset to 0. The defect mode-2 procedure is completed.

FIGS. 6 and 7 teach the following: when the defect mode-1 or -2 procedure is executed in step S13 or S15, the procedure is completed with the DF1 or DF2 status mode 2. This is shown in (e) of FIGS. 3 and 4 in which the status mode is set to 2 at the moment t3 and kept at 2 even after the moment t4.

FIG. 3 illustrates the defect mode-1 procedure (FIG. 6) that is executed for the first time against the defect DF1 that occurs as shown (b) of this figure with no prior defects. In contrast, FIG. 4 illustrates the defect mode-2 procedure (FIG. 7) that is executed against the defect DF2 that occurs as shown (b) of FIG. 4, after completion of the defect mode-1 or -2 procedure against any prior defect DF1 or DF2. When no defects occur after completion of the defect mode-1 or -2 procedure, the DF1 and DF2 status modes are kept at 2 because both steps S7 and S9 are not executed. The DF1 status mode is reset to 0 when either the defect DF1 or DF2 occurs whereas the DF2 status mode is reset to 0 when the defect DF2 occurs. In (b) of FIG. 4, the status mode is kept at 2 prior to the moment t1. This implies occurrence of either the defect DF1 or DF2 prior to the moment t1.

As disclosed in detail, the optical disc apparatus and the optical-pickup movement control method to be installed in an optical disc apparatus in the present invention achieve accurate optical-pickup movement control by: calculating a difference of absolute values of the current (latest) period T and anterior period Tz measured ½-period before the current (latest) period T, of track crossing pulses; detecting variation in ½-period of a track crossing pulse to which a defect is thought to occur and cause decrease in level of a portion of tracking error signals; and executing an appropriate correction procedure selected from preinstalled correction procedures depending on the detected variation in ½-period of the track crossing pulse.

The optical-pickup movement control under the present invention provides stable optical-pickup movement in accordance with a normal speed transition with smaller adverse effects of speed variation in a period with no track crossing pulses generated than known movement control based on the period (½ period) of track crossing pulses interpolated with dummy pulses for dropped-out pulses.

According to the optical disc apparatus and the optical-pickup movement control method to be installed in an optical disc apparatus in the present invention, defects on tracking error signals can be detected per ½-period of track crossing pulses so that variation in ½-period of the pulses can be quickly corrected, thus an optical pickup being accurately stopped over a target track even if defects occur just before the target track.

Moreover, according to the optical disc apparatus and the optical-pickup movement control method to be installed in an optical disc apparatus in the present invention, when abnormal-length ½-period is detected on track crossing pulses, instead of an average period Tav calculated by a first calculation method based on the current period T and the anterior period Tz, a corrected average period is calculated for at least a part of predetermined period by a second calculation method different from the first method based on the current period and prior periods as much as close to the current period in the time domain in one of the implemented correction procedures, thus achieving stable optical-pickup movement control with the normal-speed-transition movement servo mechanism SSV.

The present invention is not limited to the embodiments described above but available for variations or modifications within the scope of the present invention.

The optical-pickup movement control in the present invention is achieved with the normal-speed-transition movement servo mechanism SSV to make an average period Tav be identical with a reference period Tref. One variation of this mechanism is to obtain speed data based on the reciprocal of the average period Tav and make the speed data be identical with reference speed data.

In FIG. 4, the defect mode is kept at 2 for three ½-periods after the occurrence of the defect DF2. It may, however, be kept at 2 for two ½-periods after the defect DF2, thanks to an appropriate average period Tav for the period from the moments t3 and t4 based on the current period T and the anterior period Tz (one ½-interval before the current period T.

One feature of the present invention lies in two different types of calculation methods: a first calculation method to calculate an average period of the current period T and the anterior period Tz (½-period before the current period T) when abnormal-length ½-period is not detected on track crossing pulses; a second calculation method (FIGS. 3 and 4) to calculate a corrected average period for at least a part of predetermined period when abnormal-length ½-period is detected. The second calculation method may not be limited to those shown in FIGS. 3 and 4 as long as an appropriate corrected average period is obtained.

As disclosed above, according to the present invention, even if an optical disc has a damaged or dirty section on its surface, and hence reproduced signals are partially missing or subjected to decrease in signal level, a speed of a moving optical pickup can be accurately detected and controlled so that the optical pickup can be stopped over a target track.

What is claimed is:

1. The optical disc apparatus comprising:
    an optical pickup to emit a light beam to an optical disc;
    a moving mechanism to move the optical pickup over the optical disc so that a light spot of the light beam crosses tracks formed on the optical disc;
    a tracking error detector to detect tracking error signals carried by a light beam reflected from the optical disc, each tracking error signal being detected when the light spot crosses a corresponding track among the tracks formed on the optical disc;
    a track-crossing pulse generator to generate track crossing pulses based on the tracking error signals, each track crossing pulse being generated for the corresponding track;
    a period measurer to measure a half period of each track crossing pulse;
    a defect detector to determine whether a defect occurs to each track crossing pulse, based on a latest half period measured at present and an anterior half period measured one half-period before the latest half period;
    an average-period generator to generate an average half period of the latest and the anterior half periods when determined that no defect occurs whereas to generate a corrected average half period based on the latest half period and a plurality of anterior half periods measured before the latest half period when determined that the defect occurs;
    a reference period generator to generate a reference half period that indicates a predetermined speed for the optical pickup to move over the optical disc; and
    a servo mechanism to control the moving mechanism to move the optical pickup at the predetermined speed based on the reference half period and the average half period or the corrected average half period;
    wherein the defect detector detects a first abnormal state in which a half period of at least one of the track crossing pulses is out of a specific range of error variation or a second abnormal state in which the track crossing pulses suffer drop-outs; and
    wherein the defect detector detects neither the first nor the second abnormal state when a relationship (1) only is satisfied, detects the first abnormal state when a relationship (2) only is satisfied, and detects the second abnormal state when both of the relationships (1) and (2) are not satisfied, where the relationships (1) and (2) are expressed as $(Tz-\Delta T)<T<(Tz+\Delta T)$ and $T<(2 \cdot Tz-\Delta T)$, respectively, in which T and Tz indicate the latest half period and the anterior half period, respectively, and $\Delta T$ indicates the specific range of error variation.

2. The optical disc apparatus according to claim 1, wherein the average-period generator generates a first corrected average half period for a first half period that is an initial half period after a moment at which the first abnormal state is detected, a second corrected average half period for a second half period that follows the first half period, and a third corrected average half period for a third half period that follows the second half period, in which the first corrected average half period is an average half period of two consecutive half periods, in which no defect occurs, prior to the moment at which the first abnormal state is detected, the second corrected average half period is the average half period of the latest and the anterior half periods, and the third corrected average half period is an average half period of the latest half period and the second corrected average half period.

3. The optical disc apparatus according to claim 1, wherein the average-period generator generates a corrected average half period, obtained in a manner that the latest half period and the anterior half period are added and then divided by four, for an initial half period after a moment at which the second abnormal state is detected and another half period that follows the initial half period.

4. The optical-pickup movement control method comprising the steps of:
- an emitting step of emitting a light beam from an optical pickup to an optical disc;
- a first moving step of moving the optical pickup over the optical disc so that a light spot of the light beam crosses tracks formed on the optical disc;
- a tracking-error detecting step of detecting tracking error signals carried by a light beam reflected from the optical disc, each tracking error signal being detected when the light spot crosses a corresponding track among the tracks formed on the optical disc;
- a track-crossing pulse generation step of generating track crossing pulses based on the tracking error signals, each track crossing pulse being generated for the corresponding track;
- a period measuring step of measuring a half period of each track crossing pulse;
- a defect detecting step of determining whether a defect occurs to each track crossing pulse, based on a latest half period measured at present and an anterior half period measured one half-period before the latest half period;
- an average-period generating step of generating an average half period of the latest and the anterior half periods when determined that no defect occurs whereas to generate a corrected average half period based on the latest half period and a plurality of anterior half periods measured before the latest half period when determined that the defect occurs:
- a reference period generating step of generating a reference half period that indicates a predetermined speed for the optical pickup to move over the optical disc; and
- a second moving step of moving the optical pickup at the predetermined speed based on the reference half period and the average half period or the corrected average half period;
- wherein the defect detecting step includes the step of detecting a first abnormal state in which a half period of at least one of the track crossing pulses is out of a specific range of error variation or a second abnormal state in which the track crossing pulses suffer drop-outs; and
- wherein the defect detecting step includes the step of detecting neither the first nor the second abnormal state when a relationship (1) only is satisfied, detecting the first abnormal state when a relationship (2) only is satisfied, and detecting the second abnormal state when both of the relationships (1) and (2) are not satisfied, where the relationships (1) and (2) are expressed as $(Tz-\Delta T)<T<(Tz+\Delta T)$ and $T<(2\cdot Tz-\Delta T)$, respectively, in which T and Tz indicate the latest half period and the anterior half period, respectively, and $\Delta T$ indicates the specific range of error variation.

5. The movement control method according to claim 4, wherein the average-period generating step includes the step of generating a first corrected average half period for a first half period that is an initial half period after a moment at which the first abnormal state is detected, a second corrected average half period for a second half period that follows the first half period, and a third corrected average half period for a third half period that follows the second half period, in which the first corrected average half period is an average half period of two consecutive half periods, in which no defect occurs, prior to the moment at which the first abnormal state is detected, the second corrected average half period is the average half period of the latest and the anterior half periods, and the third corrected average half period is an average half period of the latest half period and the second corrected average half period.

6. The optical disc apparatus according to claim 4, wherein the average-period generating step includes the step of generating a corrected average half period, obtained in a manner that the latest half period and the anterior half period are added and then divided by four, for an initial half period after a moment at which the second abnormal state is detected and another half period that follows the initial half period.

* * * * *

UNITED STATES PATENT AND TRADEMARK OFFICE
CERTIFICATE OF CORRECTION

PATENT NO.       : 7,643,388 B2
APPLICATION NO. : 11/603497
DATED            : January 5, 2010
INVENTOR(S)      : Shigeru Kawase It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 594 days.

Signed and Sealed this

Sixteenth Day of November, 2010

David J. Kappos
*Director of the United States Patent and Trademark Office*